United States Patent [19]

Shih

[11] Patent Number: 5,281,813
[45] Date of Patent: Jan. 25, 1994

[54] LASER RANGEFINDER TEST SYSTEM

[75] Inventor: I-Fu Shih, Los Alamitos, Calif.

[73] Assignee: Hughes Aircraft Company, Los Angeles, Calif.

[21] Appl. No.: 907,772

[22] Filed: Jun. 30, 1992

[51] Int. Cl.⁵ .................... G01C 25/00; G01C 3/08
[52] U.S. Cl. ........................... 250/252.1; 356/6
[58] Field of Search .......... 250/252.1 A, 342; 356/5, 6

[56] References Cited

U.S. PATENT DOCUMENTS

| | | | |
|---|---|---|---|
| 4,236,904 | 12/1980 | Lazau | 356/432 X |
| 4,342,514 | 8/1982 | Mathews et al. | 356/5 |
| 4,627,723 | 12/1986 | French et al. | 356/6 X |
| 4,975,573 | 12/1990 | Girard | 250/252.1 |

Primary Examiner—Constantine Hannaher
Assistant Examiner—Edward J. Glick
Attorney, Agent, or Firm—Wanda K. Denson-Low

[57] ABSTRACT

An inexpensive, broadband technique for testing laser rangefinder systems. The invention includes a mechanism (18) for detecting an emission of a pulse of electromagnetic energy by a laser rangefinder under test (12) and providing a first signal in response thereto. In response to the first signal, a second signal is generated (20) with a predetermined delay on detection of the pulse from the laser rangefinder (12). The second signal is used to trigger a radiation source (16) which generates an output signal. This output signal simulates a return signal, the reflection of the pulse from a hypothetical target back to the laser rangefinding system.

5 Claims, 1 Drawing Sheet

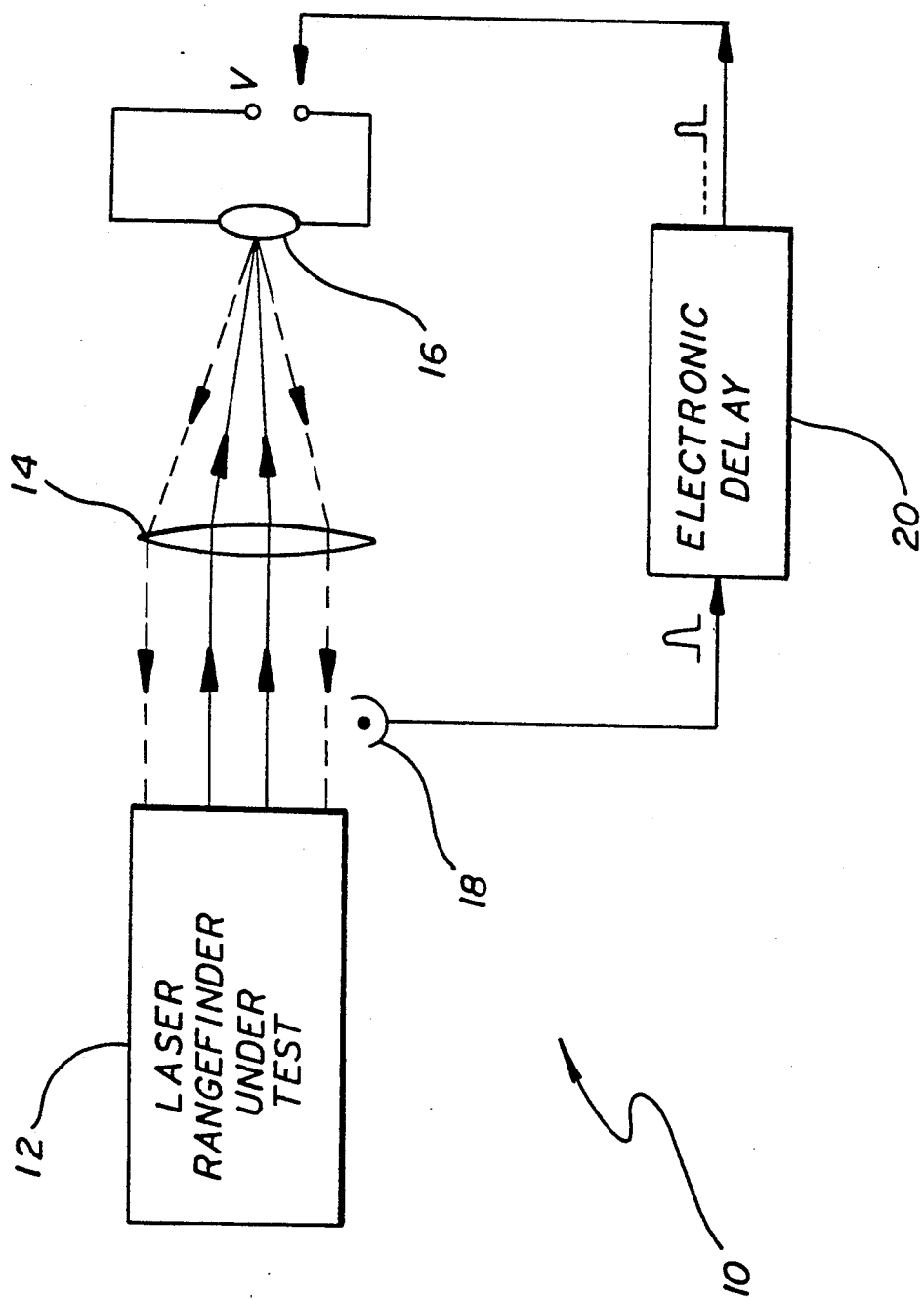

LASER RANGEFINDER TEST SYSTEM

BACKGROUND OF THE INVENTION

1. Field of the Invention:

The present invention relates to range finding systems. More specifically, the present invention relates to systems for testing laser rangefinder systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art:

Laser rangefinders are well known in the art. These systems offer highly accurate range measurements. A typical laser rangefinder may determine the range of an object at a distance of 2000 meters within ±5 meters.

Laser rangefinders consist of a laser which transmits of pulse of energy downrange toward a target. This pulse is reflected by the target and detected by the rangefinder. The round-trip delay of the return pulse is measured and used for the range calculation.

Laser rangefinders are precision instruments requiring testing and calibration to ensure optimum performance. Current options for testing these systems include field tests and laboratory tests.

Field testing involves use of the rangefinder to measure the range to a target which is set up at a known distance from the rangefinder. The measurement provided by the rangefinder is compared to the known range to facilitate the test. Unfortunately, field testing is inconvenient and therefore costly.

Testing in the laboratory is somewhat more convenient and less costly than field testing. Conventional laboratory testing involves the 1) use of optical fibers or 2) use of electronic circuitry.

Optical fiber based laboratory testing systems include an optical fiber of a known length which has an optical path length equal to the distance at which the measurement is to be taken. Unfortunately, the limited optical bandwidth of optical fibers precludes the ability of the system to test long wavelength lasers. For example, optical fiber testing systems have a bandwidth limited to 0.4–2.0 microns and can not be used to test carbon dioxide lasers which operate in the ten micron range.

Conventional electrical laboratory testing systems typically include a photodetector which detects the pulse from the laser rangefinder. The signal from the photodetector is delayed and used to trigger a radiation source to simulate the round-trip delay from the rangefinder to the target and vice versa. However, this system is also limited in bandwidth by the operating range of the photodetector.

Thus, a need remains in the art for an inexpensive technique for testing long wavelength laser rangefinders in a laboratory environment.

SUMMARY OF THE INVENTION

The need in the art is addressed by the present invention which provides an improved laser rangefinder test system. In most general terms, the invention includes a mechanism for detecting an emission of a pulse of electromagnetic energy by a laser rangefinder under test and providing a first signal in response thereto. In response to the first signal, a second signal is generated with a predetermined delay on detection of the pulse from the laser rangefinder. The second signal is used to trigger a radiation source which generates an output signal. This output signal simulates a return signal, the reflection of the pulse from a target back to the laser rangefinding system. The invention thus provides an inexpensive, broadband technique for testing laser rangefinder systems.

BRIEF DESCRIPTION OF THE DRAWINGS

The FIGURE is diagram depicting the inventive system in an exemplary laser rangefinder testing arrangement.

DESCRIPTION OF THE INVENTION

Illustrative embodiments and exemplary applications will now be described with reference to the accompanying drawings to disclose the advantageous teachings of the present invention.

The FIGURE is diagram depicting the inventive system 10 in an exemplary laser rangefinder testing arrangement. The laser rangefinder under test 12 provides a pulsed beam of electromagnetic energy. The beam is focused by a lens 14 onto a pulsed radiation source 16. The beam is sensed by a detector 18 which is mounted in close proximity thereto. The detector provides a first signal to a conventional delay circuit 20 suitable for laboratory use.

The delay circuit 20 is set or programmed to output a second signal after a predetermined time of receipt of the first signal. The programmed delay is set to equal the time required for the pulse emitted by the rangefinder 12 to travel a predetermined distance to a hypothetical target, i.e., 13.3 microseconds corresponding to say 2000 meters.

The time delayed second signal is provided as a trigger pulse to the radiation source 16. The radiation emitted from the source 16 simulates the return from the hypothetical target of the signal emitted by the rangefinder 12. The radiation from the source is guided by the collimating lens 14 into the rangefinder receiving aperture (not shown) and detected by the rangefinder 12.

The radiation source should emit a pulse which has a wavelength, pulse shape, and pulse duration similar to that of the output pulse of the rangefinder 12 under test. The source 16 should also be able to be triggered precisely and provide sufficient radiation power for its output to be detected by the rangefinder 12.

For a rangefinder operating at 10.6 microns, typical requirements for the radiation source may be:
 pulse width: approx. 60 nsec.,
 rise time: approx. 20 nsec.,
 repetition rate: >10 Hz.,
 triggering accuracy: 5 nsec.,
 wavelength: 10.6 microns, and
 radiation power: 20 nw at the entrance aperture of the rangefinder.

The source should also be able to withstand the intensity of the focused laser power of the rangefinder under test.

In the preferred embodiment, the radiation source 16 is implemented with a plasma discharge tube such as that sold by Optitron Inc., of Torrance, Calif. A device provided by this manufacturer when operated with nitrogen gas at 2 atmospheres of pressure can meet the requirements stated above and produce sufficient power for a rangefinder operating at 10.6 microns.

The device is a blackbody source operating at approximately 10,000° K. As a result, it can produce more powerful outputs at lower wavelengths of interest such as 1.06 microns for Neodymium YAG laser rangefinders and 1.5 microns for some "eye-safe" laser rangefinders. Hence, the same device can be used to build a universal rangefinder test system for a variety of laser rangefinders.

Finally, the device sold by Optitron is able to withstand the focused power of the laser because the focus will be at the gap between the electrodes of the device.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly,

What is claimed is:

1. An improved laser rangefinder test system comprising:
   detector means for detecting an emission of a pulse of electromagnetic energy by a laser rangefinder and providing a first signal in response thereto;
   delay means, connected to said detector means, for providing a second signal at a predetermined time after the receipt of said first signal; and
   source means connected to said delay means and including a broadband source for generating an output signal on receipt of said second signal, said output signal simulating a return signal and representing the reflection of said pulse from a target to said laser rangefinder system;
   wherein said broadband source is a plasma discharge tube.

2. The invention of claim 1 wherein said predetermined time is equal to the time required for said purse to travel a predetermined distance from said rangefinder system.

3. The invention of claim 1 including collimating means for directing said output signal generated by said source onto said rangefinder.

4. An improved laser rangefinder test system comprising:
   detector means for detecting an emission of a pulse of electromagnetic energy by a laser rangefinder and providing a first signal in response thereto;
   delay means, connected to said detector means, for providing a second signal at a predetermined time after the receipt of said first signal, said predetermined time being equal to the time required for said pulse to travel a predetermined distance from said rangefinder system; and
   source means, including a plasma discharge tube, connected to said delay means, for generating an output signal on receipt of said second signal, said output signal simulating a return signal and represents the reflection of said pulse from a target to said laser rangefinding system.

5. An improved laser rangefinder testing method including the steps of:
   detecting an emission of a pulse of electromagnetic energy by a laser rangefinder and providing a first signal in response thereto;
   receiving said first signal and providing a second signal at a predetermined time after the receipt of said first signal; and
   providing a plasma discharge tube source means for generating an output signal on receipt of said second signal, said output signal simulating a return signal and representing the reflection of said pulse from a target to said laser rangefinder system.

* * * * *